United States Patent
Kitabayashi

(10) Patent No.: US 10,666,723 B2
(45) Date of Patent: May 26, 2020

(54) DATA DISTRIBUTION SYSTEM, DATA COMMUNICATION DEVICE AND PROGRAM FOR DATA DISTRIBUTION

(71) Applicant: Skeed Co., Ltd., Tokyo (JP)

(72) Inventor: Takumi Kitabayashi, Tokyo (JP)

(73) Assignee: Skeed Co. Ltd., Tokyo (JP)

(*) Notice: Subject to any disclaimer, the term of this patent is extended or adjusted under 35 U.S.C. 154(b) by 965 days.

(21) Appl. No.: 14/891,127

(22) PCT Filed: Mar. 27, 2014

(86) PCT No.: PCT/JP2014/058966
§ 371 (c)(1),
(2) Date: May 6, 2016

(87) PCT Pub. No.: WO2014/185167
PCT Pub. Date: Nov. 20, 2014

(65) Prior Publication Data
US 2016/0255147 A1    Sep. 1, 2016

(30) Foreign Application Priority Data
May 16, 2013    (JP) .................................. 2013-104584

(51) Int. Cl.
*H04L 29/08* (2006.01)
*H04L 12/24* (2006.01)

(52) U.S. Cl.
CPC .......... *H04L 67/1042* (2013.01); *H04L 41/12* (2013.01); *H04L 67/104* (2013.01);
(Continued)

(58) Field of Classification Search
None
See application file for complete search history.

(56) References Cited

U.S. PATENT DOCUMENTS

2006/0168104 A1* 7/2006 Shimizu ............ G06F 17/30017
709/218
2009/0300673 A1* 12/2009 Bachet ............... H04N 7/17318
725/31

(Continued)

FOREIGN PATENT DOCUMENTS

WO    2012153173 A2    11/2012

OTHER PUBLICATIONS

Extended European Search Report issued in corresponding European Application No. 14797775.5 dated Feb. 24, 2017, 10 pages.

*Primary Examiner* — James A Edwards
(74) *Attorney, Agent, or Firm* — MKG, LLC

(57) ABSTRACT

Destination data communication device receives data to be distributed either directly from source data communication device or via another destination data communication device. For each destination data communication device, management data communication device receives, each time a predetermined interval has passed, a communication status data set indicating a communication speed for each communication party and a stored data volume data set indicating a volume of data to be distributed that has already been stored by each destination data communication device. Management data communication device determines a flexible arrangement of destination data communication devices and paths for transmission and reception of data between destination data communication devices based on the foregoing data. Each destination data communication device transmits data blocks to and receives data blocks from communication parties determined by management data communication device.

2 Claims, 9 Drawing Sheets

(52) U.S. Cl.
CPC ...... *H04L 67/1085* (2013.01); *H04L 67/1097* (2013.01); *H04L 67/32* (2013.01); *H04L 29/08* (2013.01)

(56) References Cited

U.S. PATENT DOCUMENTS

| | | | |
|---|---|---|---|
| 2010/0039982 A1* | 2/2010 | Itagaki | H04W 40/22 |
| | | | 370/315 |
| 2010/0158000 A1 | 6/2010 | Muramoto et al. | |
| 2010/0293044 A1* | 11/2010 | Kozai | G06Q 30/02 |
| | | | 705/14.4 |

\* cited by examiner (a)

| TRANSMITTING SIDE | COMMUNI-CATION SPEED | RECEIVING SIDE | COMMUNI-CATION SPEED |
|---|---|---|---|
| (IP ADD. OF SOURCE DATA COMMUNICATION DEVICE 12) | ### bps | (IP ADD. OF DESTINATION DATA COMMUNICATION DEVICE 13-3) | ### bps |
| (IP ADD. OF DESTINATION DATA COMMUNICATION DEVICE 13-1) | ### bps | (IP ADD. OF DESTINATION DATA COMMUNICATION DEVICE 13-4) | ### bps |

(b)

| VOLUME OF STORED DATA | ### % |
|---|---|

FIG. 5

DATA DISTRIBUTION SYSTEM, DATA COMMUNICATION DEVICE AND PROGRAM FOR DATA DISTRIBUTION

TECHNICAL FIELD

This invention relates to a technique for distributing data via a network.

BACKGROUND

Peer to Peer architecture (P2P) for communicating between a large number of data communication devices in a network is widely used. In P2P, each data communication device directly communicates with other data communication devices without being distinguished as either a server device or a client device; and each data communication device receives data stored in other data communication devices and transmits data stored in the data communication device to other data communication devices. As a result, data is distributed from a data communication device as a distribution source to a data communication device as a distribution destination via plural data communication devices.

For example, patent documents 1-3 disclose data distribution techniques using P2P. Patent document 1 discloses a method where a device receives information on transmission performance of receiving devices from each receiving device, classifies the receiving devices into classes based on bandwidth available to each receiving device estimated based on the information on transmission performance, and arranges the receiving devices in a descending order of the estimated bandwidth available in each class to determine a unicast path via which to distribute data from a specific distribution source to a specific distribution destination. In patent document 1, it is described that the device may receive the information on transmission performance of receiving devices and may update the determined unicast path at predetermined intervals.

[Patent document 1] JP Patent Publication No. 4598073

For example, it is assumed that a same data set (referred to as a distribution target data set hereinafter) is required to be transmitted from a head office to each of its branch offices. If a distribution server device is installed at the head office as a distribution source and the distribution server device distributes the distribution target data set to terminal devices installed at the branch offices, the transmission requirement is achieved. However, when there is a large number of branch offices, data transmission ability of the distribution server device may be reduced due to a bottleneck and it may take a long time to complete the distribution of the distribution target data set to all of the terminal devices at the branch offices.

To alleviate the above-mentioned problem, installation of a system that comprises a load distribution server device and plural distribution server devices has been considered. According to this system, the load distribution server device assigns terminal devices to distribution server devices, and each distribution server device distributes the distribution target data set to the assigned terminal devices in parallel. This system requires installation and maintenance of plural server devices, and is costly.

SUMMARY

In view of the foregoing, it is an object of the present invention to provide a means that enables speedy distribution of a same data set from a data communication device as a distribution source to each of plural data communication devices as distribution destinations at low cost.

To solve the above mentioned problem, the present invention provides a data distribution system comprising: plural distribution data communication devices each of which performs at least one of transmission of data to be distributed and reception of the data to be distributed, and a management data communication device that manages paths of data communications among the plural distribution data communication devices; wherein the management data communication device comprises a receiving unit that receives, each time a predetermined condition is met, from each of the plural distribution data communication devices, a communication status data set indicating a communication speed at which the plural distribution data communication device communicates with each of its counter parties, and a stored data volume data set indicating a volume of data that is at least a part of the data to be distributed and is stored in the distribution data communication device, a determining unit that determines, each time a predetermined condition is met, for each of the plural distribution data communication devices, one or more communication parties from among the plural distribution data communication devices based on the communication status data sets and the stored data volume data sets received by the receiving unit in accordance with a predetermined rule, and a transmitting unit that transmits to each of the plural distribution data communication devices a communication party data set indicating one or more communication parties of the distribution data communication device determined by the determining unit; each of the plural distribution data communication devices comprises a receiving unit that receives from the management data communication device a communication party data set indicating one or more communication parties of distribution data communication device, a transmitting unit that transmits data to the management data communication device, an instructing unit that performs at least one of an instruction to the receiving unit of the distribution data communication device to receive at least a part of the data to be distributed from one or more communication parties indicated by the communication party data set received by the receiving unit of the distribution data communication device and an instruction to the transmitting unit of the distribution data communication device to transmit at least a part of the data to be distributed to one or more communication parties indicated by the communication party data set received by the receiving unit of the distribution data communication device, a storing unit that stores at least a part of the data to be distributed received by the receiving unit of the distribution data communication device, and a generating unit that generates a stored data volume data set indicating a volume of data that is at least a part of the data to be distributed and is stored in the storing unit of the distribution data communication device, and a communication status data set indicating at least one of a communication speed at which the transmitting unit of the distribution data communication device transmits at least a part of the data to be distributed to each communication party in accordance with the instruction performed by the instructing unit and a communication speed at which the receiving unit of the distribution data communication device received at least a part of the data to be distributed from each communication party in accordance with the instruction performed by the instructing unit; and the transmitting unit of each of the plural distribution data communication devices transmits to the management data communication device, each time a predetermined condition is met, the communication status data set and the stored data volume data set generated by the generating unit.

In the above mentioned data distribution system, each of the plural distribution data communication devices may comprise a selecting unit that selects, when a communication party data set received by the receiving unit of the distribution data communication device indicates plural communication parties, one or more communication parties from among the plural communication parties indicated by the communication party data set based on a communication status data set generated by the generating unit of the distribution data communication device in accordance with a predetermined rule, and the instructing means may perform at least one of an instruction to the receiving unit of the distribution data communication device to receive at least a part of the data to be distributed from the one or more communication parties selected by the selecting unit and an instruction to the transmitting unit of the distribution data communication device to transmit at least a part of the data to be distributed to the one or more communication parties selected by the selecting means.

The present invention further provides a data communication device comprising: a receiving unit that receives, each time a predetermined condition is met, from each of plural distribution data communication devices each of which performs at least one of transmission of data to be distributed and reception of the data to be distributed, a communication status data set indicating a communication speed at which the plural distribution data communication device communicates with each of its counter parties, and a stored data volume data set indicating a volume of data that is at least a part of the data to be distributed and is stored in the distribution data communication device, a determining unit that determines, each time a predetermined condition is met, for each of the plural distribution data communication devices, one or more communication parties from among the plural distribution data communication devices based on the communication status data sets and the stored data volume data sets received by the receiving unit in accordance with a predetermined rule, and a transmitting unit that transmits to each of the plural distribution data communication devices a communication party data set indicating one or more communication parties of the distribution data communication device determined by the determining unit.

The present invention further provides a data communication device comprising: a receiving unit that receives, from a management data communication device that manages paths of data to be distributed that is transmitted and received among plural data communication devices, a communication party data set indicating one or more communication parties, a transmitting unit that transmits data to the management data communication device, an instructing unit that performs at least one of an instruction to the receiving unit to receive at least a part of the data to be distributed from one or more communication parties indicated by the communication party data set received by the receiving unit and an instruction to the transmitting unit to transmit at least a part of the data to be distributed to one or more communication parties indicated by the communication party data set received by the receiving unit, a storing unit that stores at least a part of the data to be distributed received by the receiving unit, and a generating unit that generates a stored data volume data set indicating a volume of data that is at least a part of the data to be distributed and is stored in the storing unit, and a communication status data set indicating at least one of a communication speed at which the transmitting unit transmitted at least a part of the data to be distributed to each communication party in accordance with the instruction performed by the instructing unit and a communication speed at which the receiving unit received at least a part of the data to be distributed from each communication party in accordance with the instruction performed by the instructing unit, wherein the transmitting unit transmits to the management data communication device, each time a predetermined condition is met, the communication status data set and the stored data volume data set generated by the generating unit.

The above mentioned data communication device may comprise a selecting unit that selects, when the communication party data set received by the receiving unit indicates plural communication parties, one or more communication parties from among the plural communication parties indicated by the communication party data set in accordance with a predetermined rule based on the communication status data set generated by the generating unit, and the instructing means may perform at least one of an instruction to the receiving unit to receive at least a part of the data to be distributed from the one or more communication parties selected by the selecting unit and an instruction to the transmitting unit to transmit at least a part of the data to be distributed to the one or more communication parties selected by the selecting means.

The present invention further provides a program for causing a computer having a communication unit for communicating with one or more data communication devices to execute: receiving, each time a predetermined condition is met, from each of plural distribution data communication devices each of which performs at least one of transmission of data to be distributed and reception of the data to be distributed, a communication status data set indicating a communication speed at which the plural distribution data communication device communicates with each of its counter parties, and a stored data volume data set indicating a volume of data that is at least a part of the data to be distributed and is stored in the distribution data communication device, determining, each time a predetermined condition is met, for each of the plural distribution data communication devices, one or more communication parties from among the plural distribution data communication devices based on the received communication status data sets and the received stored data volume data sets in accordance with a predetermined rule, and transmitting to each of the plural distribution data communication devices a communication party data set indicating the determined one or more communication parties of the distribution data communication device.

The present invention further provides a program for causing a computer having a communication unit for communicating with one or more data communication devices to execute: receiving, from a management data communication device that manages paths of data to be distributed that is transmitted and received among plural data communication devices, a communication party data set indicating one or more communication parties, performing at least one of transmission of at least a part of the data to be distributed to one or more communication parties indicated by the received communication party data and reception of at least a part of the data to be distributed from one or more communication parties indicated by the received communication party data, storing the received at least a part of the data to be distributed, and generating a stored data volume data set indicating a volume of data that is at least a part of the data to be distributed and is stored, generating a communication status data set indicating at least one of a communication speed at which transmission of at least a part of the data to be distributed to each communication party was performed and a communication speed at which reception of at least a part of the data to be distributed from each communication party was performed, and transmitting, to the management data communication device, each time a predetermined condition is met, the generated communication status data set and the generated stored data volume data set.

The above mentioned program may cause the computer to execute: selecting, when the received communication party data set indicates plural communication parties, one or more communication parties from among the plural communication parties indicated by the communication party data set in accordance with a predetermined rule based on the generated communication status data set, and in the step of performing at least one of transmission and reception of at least a part of the data to be distributed, performing at least one of transmission of at least a part of the data to be distributed to the selected one or more communication parties and reception of at least a part of the data to be distributed from the selected one or more communication parties.

According to the present invention, for example, each time a predetermined condition, for example, expiration of a predetermined interval, is met, each of plural distribution data communication devices transmits to a management data communication device a communication status data set and a stored data volume data set, the communication status data set indicating a communication speed at which data communication is performed with each communication party, and the stored data volume data set indicating volume of distribution data that is stored in the distribution data communication device. The management data communication device assigns a communication party of each distribution data communication device based on the communication status data set and the stored data volume data set for the distribution data communication device. Each distribution data communication device communicates with the communication party assigned by the management data communication device.

A data communication device that receives data to be distributed is one of the plural distribution data communication devices that transmit and receive the data to be distributed, and it may transmit the received data to be distributed to another data communication device that is also one of the plural distribution data communication devices.

The management data communication device appropriately changes an order of distribution data communication devices on a path of data distribution in accordance with a predetermined rule, for example, a distribution data communication device that stores a large volume of data to be distributed is located in an upstream side of the path and a distribution data communication device that stores a small volume of data to be distributed is located in a downstream side of the path. As a result, a time required for data to be distributed from a source of the data to all of the destinations of the data is shortened. There is no need to install a load distribution server device and plural distribution servers according to the present invention. As a result, the present invention is implemented inexpensively.

BRIEF DESCRIPTION OF THE DRAWINGS

FIG. 5($a$)-($b$) illustrates examples of data structures of a communication status data set and a stored data volume data set used in an exemplary embodiment of the present invention.

DETAILED DESCRIPTION

[Exemplary Embodiment]

Figure 1:
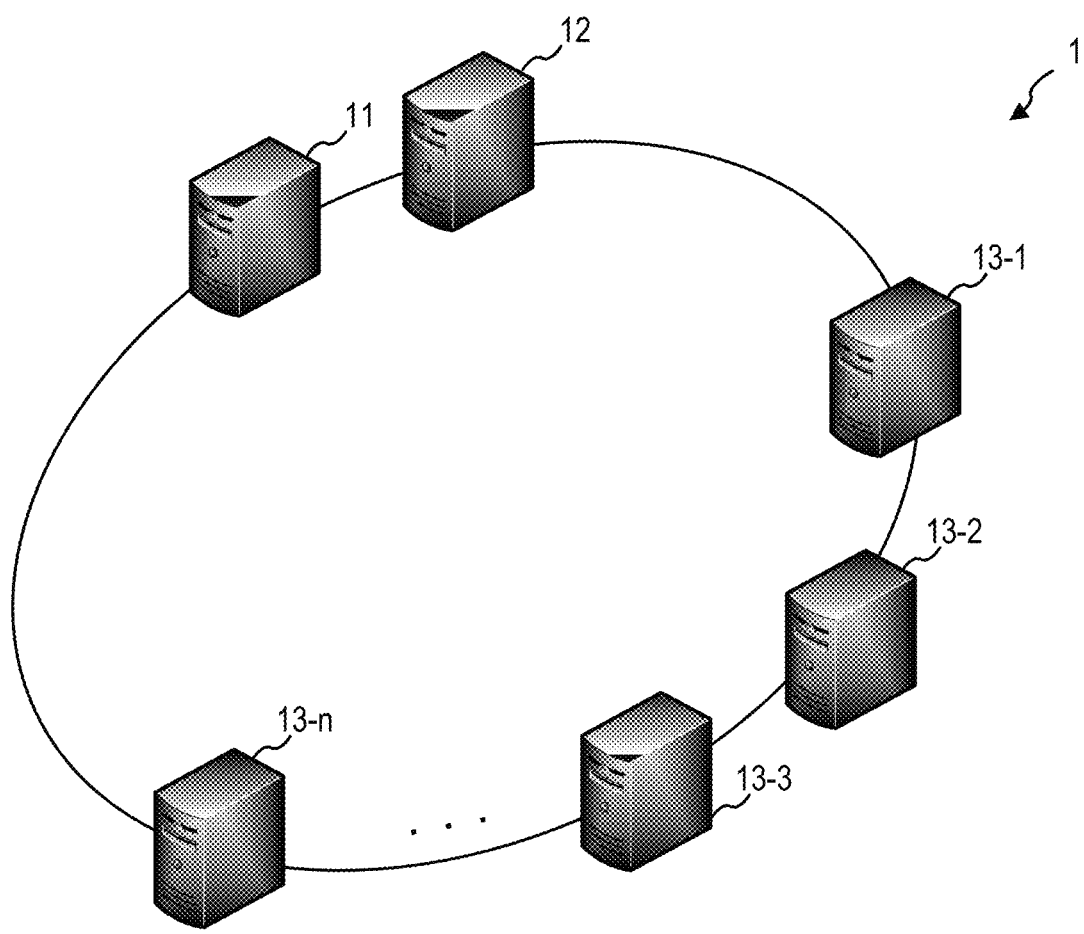
FIG. 1 illustrates an overall configuration of a data distribution system according to an exemplary embodiment of the present invention.

A configuration of data distribution system 1 according to an exemplary embodiment of the present invention and operations executed by data distribution system 1 are now explained. FIG. 1 illustrates an overall configuration of data distribution system 1. Data distribution system 1 is a system for distributing data to be distributed from source data communication device 12 to each of destination data communication device 13-1, destination data communication device 13-2 . . . , and destination data communication device 13-$n$ ("n" is a natural number). Destination data communication device 13-1, destination data communication device 13-2 . . . , and destination data communication device 13-$n$ are referred to as "destination data communication devices 13" hereinafter.

In data distribution system 1, each of destination data communication devices 13 forwards at least a part of data to be distributed that is received from source data communication device 12 or one of destination data communication devices 13 to one of destination data communication devices 13 in a bucket relay manner. Namely, destination data communication device 13 functions as a data communication device in transmitting side of at least a part of data to be distributed. In this application, source data communication device 12 and destination data communication devices 13 are referred to as "distribution data communication devices" hereinafter.

In data distribution system 1, data to be distributed is divided into plural data blocks, and each data block is transmitted from one distribution data communication device to another distribution data communication device in an order following positions of the data blocks in the data to be distributed.

In data distribution system 1, a flexible arrangement of destination data communication devices 13 on a path of data distribution, i.e. a path of the bucket relay, is dynamically changed for the purpose of reducing time required for distributing the data to be distributed.

In this application, the phrase "dynamically changed" means that a flexible arrangement of destination data communication devices 13 is appropriately changed in response to a change in a number of data blocks that each destination data communication device 13 has already received and a data communication speed at which each destination data communication device 13 communicates with other distribution data communication devices.

In this application, the phrase "flexible arrangement" means that an arrangement is not definitively determined. In data distribution system 1, some of destination data communication devices 13 are given plural candidate communication parties in the flexible arrangement. Each of the destination data communication devices 13 is allowed to select autonomously some of the candidate communication parties as actual communication parties, for example, based on communication speeds of the candidate communication parties. Accordingly, an actual path of data distribution is not uniquely determined, and has a flexible arrangement.

Data distribution system 1 comprises management data communication device 11 that determines the above-explained flexible arrangement of destination data communication devices 13.

Each of management data communication device 11, source data communication device 12 and destination data communication device 13 is realized by a general computer with a communication unit for performing data communications with other data communication devices via a network when the computer executes data processing instructed by an application program according to this exemplary embodiment.

Figure 2:
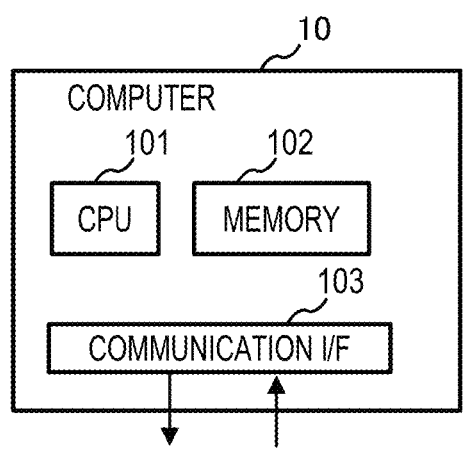
FIG. 2 is a block diagram illustrating a hardware configuration of a management data communication device, a source data communication device, and a destination data communication device according to an exemplary embodiment of the present invention.

FIG. 2 is a block diagram illustrating a hardware configuration of each of management data communication device 11, source data communication device 12, and destination data communication device 13. Namely, computer 10 may be used as hardware for any one of management data communication device 11, source data communication device 12, and destination data communication device 13. Computer 10 comprises CPU 101, memory 102, and communication I/F 103. CPU 101 performs various types of data processing following instructions given by programs including an operation system and application programs, and controls other components of computer 10. Memory 102 stores various types of data including the above-mentioned programs. Communication I/F 103 is an interface for communicating various types of data with other data communication devices.

Figure 3:
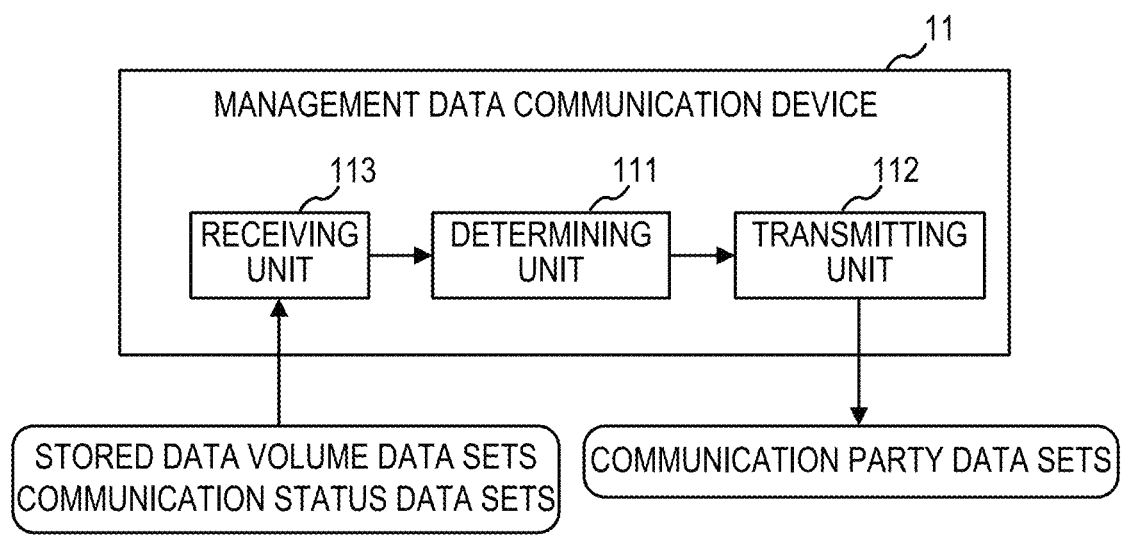
FIG. 3 is a block diagram illustrating a functional configuration of a management data communication device according to an exemplary embodiment of the present invention.

FIG. 3 is a block diagram illustrating a functional configuration of management data communication device 11. Namely, computer 10 used as hardware of management data communication device 11 functions as a device comprising components shown in FIG. 3 when it executes data processing following instructions in accordance with an application program according to this exemplary embodiment for management data communication device 11.

Management data communication device 11 comprises determining unit 111, transmitting unit 112 and receiving unit 113. Determining unit 111 determines flexible arrangements of destination data communication devices 13. Determining unit 111 generates communication party data sets each indicating a communication party of each distribution data communication device in accordance with a flexible arrangement. Transmitting unit 112 transmits each communication party data set generated by determining unit 111 to each distribution data communication device. Receiving unit 113 receives a communication status data set from each distribution data communication device. A communication status data set indicates a communication speed at which a distribution data communication device communicates with each communication party indicated by a communication party data transmitted by transmitting unit 112 to the distribution data communication device.

Figure 4:
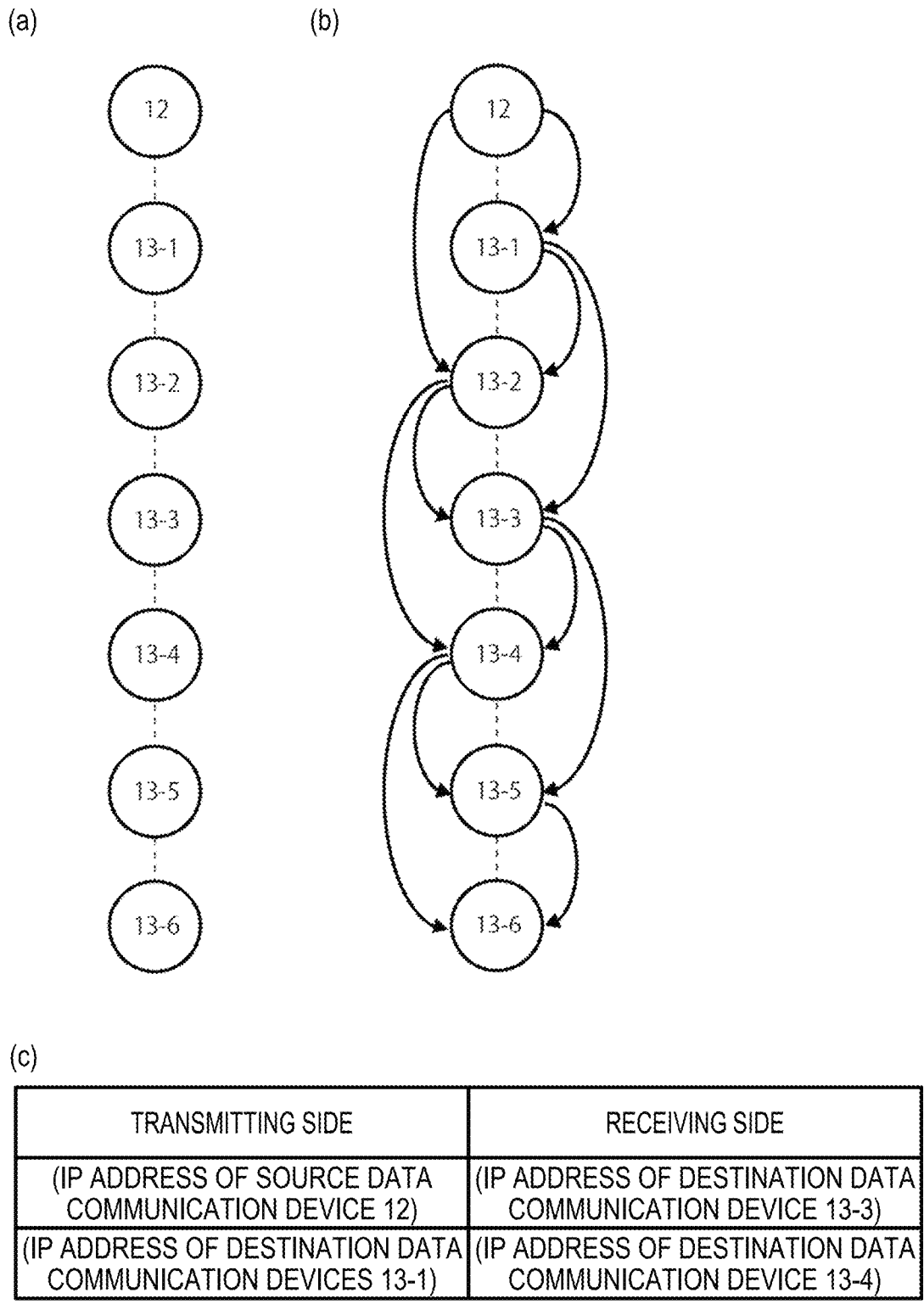
FIG. 4($a$)-($c$) illustrates how a management data communication device determines a flexible arrangement of distribution data communication devices in an exemplary embodiment of the present invention.

FIG. 4(a)-(c) illustrates how management data communication device 11 determines a flexible arrangement of destination data communication devices 13 in an example case where a number of destination data communication devices 13 is six. Each circle shown in FIG. 4 indicates each distribution data communication device.

If receiving unit 113 has not received stored data volume data sets and communication status data sets from destination data communication devices 13 when a new data is ready to be distributed from source data communication device 12 to destination data communication devices 13, determining unit 111 arranges destination data communication devices 13 on a single line as shown in FIG. 4(a). Determining unit 111 determines the order of destination data communication devices 13 on the line, for example, in a random manner. In the example case shown in FIG. 4(a), destination data communication devices 13-1 to 13-6 are arranged on the single line from the upstream side to the downstream side as a result of the random sort. This order of destination data communication devices 13 on the line has no significance at this stage. In this application, the term "upstream" means an upstream in a direction of transmission of data to be distributed. Similarly, the term "downstream" means a downstream in a direction of transmission of data to be distributed.

Next, determining unit 111 determines paths of data communications between two distribution data communication devices from among seven distribution data communication devices as shown by arrows in FIG. 4(b). In the example case shown in FIG. 4(b), determining unit 111 determines the paths of data communications in accordance with a predetermined rule that each destination data communication device 13 should receive data from the first nearest distribution data communication device in upstream side and from the second nearest distribution data communication device in upstream side. (When there is no distribution data communication device in upstream side in accordance with the rule, no path is placed in the section.)

Next, determining unit 111 generates a communication party data set for each destination data communication device 13 in accordance with the paths of data communications determined in the above-explained manner FIG. 4(c) shows an example of communication party data set generated by determining unit 111 for destination data communication device 13-2 shown in FIG. 4(b). As shown in FIG. 4(c), a communication party data set usually indicates one or more IP addresses of distribution data communication devices in transmitting side and one or more IP addresses of distribution data communication devices in receiving side. However, a communication party data set for destination data communication device 13 that is located at the downstream end like destination data communication device 13-6 in FIG. 4(*b*) indicates no IP address of distribution data communication device in receiving side. Similarly, a communication party data set for source data communication device 12 that is located at the upstream end indicates no IP address of distribution data communication device in transmitting side.

Each communication party data set generated by determining unit 111 in the above-explained manner is transmitted to each of source data communication device 12 and destination data communication devices 13 by transmitting unit 112. Each of source data communication device 12 and destination data communication devices 13 starts transmissions and receptions of data blocks of data to be distributed with communication parties indicated by the communication party data set received from management data communication device 11.

After a predetermined time has passed, source data communication device 12 transmits a communication status data set to management data communication device 11, and each destination data communication device 13 transmits a communication status data set and a stored data volume data set to management data communication device 11. Receiving unit 113 receives these data sets transmitted from the distribution data communication devices.

FIG. 5(*a*)-(*b*) illustrates an example of data structure of a communication status data set (FIG. 5(*a*)) and an example of data structure of a stored data volume data set (FIG. 5(*b*)). As shown in FIG. 5(*a*), a communication status data set indicates an average communication speed at which the distribution data communication device communicated with each communication party (in transmitting side or in receiving side) in the most recent predetermined length of time. Destination data communication device 13 may autonomously determine not to communicate with some of candidate communication parties indicated by a communication party data set. A communication status data set indicates "null" as a communication speed in connection with a communication party with which destination data communication device 13 did not communicate with the most recent predetermined length of time. As shown in FIG. 5(*b*), a stored data volume data set indicates a percentage of a number of data blocks that destination data communication device 13 has already received to a total number of data blocks to be distributed.

Figure 6:
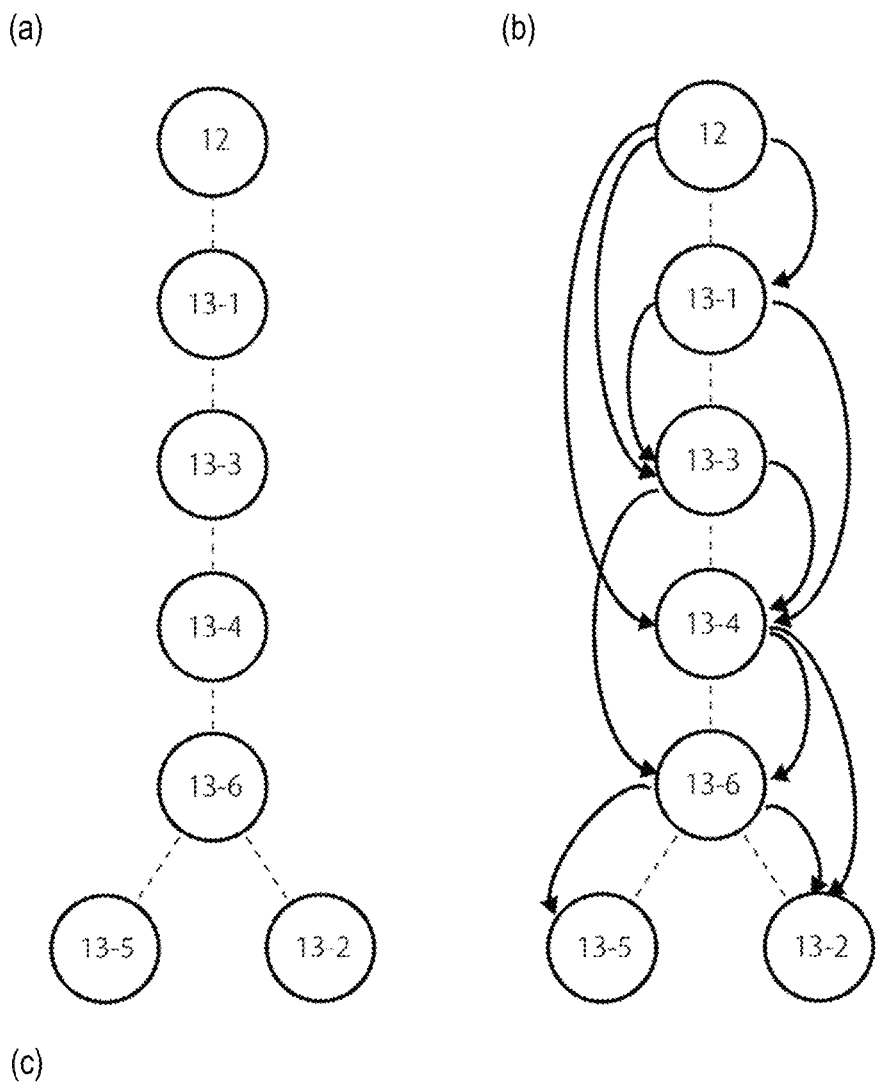
FIG. 6($a$)-($c$) illustrates how a management data communication device determines a flexible arrangement of distribution data communication devices in an exemplary embodiment of the present invention.

Communication status data sets and stored data volume data sets received by receiving unit 113 are used by determining unit 111 to update the flexible arrangement of destination data communication devices 13, i.e. to generate a new set of communication party data sets. More concretely, determining unit 111 determines a new flexible arrangement of destination data communication devices 13 in accordance with rules explained below based on communication speeds of source data communication device 12 and destination data communication devices 13 indicated by the communication status data sets and on ratios of data blocks that have been received by destination data communication devices 13 indicated by the stored data volume data sets. FIG. 6(*a*)-(*c*) illustrates how determining unit 111 determines a new flexible arrangement based on the communication status data sets and the stored data volume data sets.

(1) The faster a communication speed is at which destination data communication device 13 transmits data blocks to its communication parties in receiving side, the closer a position to the upstream end should be determined as a position of destination data communication device 13 in a new flexible arrangement.

(2) The larger a number of data blocks that have been already stored in destination data communication device 13 is, the closer a position to the upstream end should be determined as a position of destination data communication device 13 in the new flexible arrangement.

(3) The faster a communication speed is at which destination data communication device 13 receives data blocks from its communication parties in transmitting side, the closer a position to the upstream end should be determined as a position of destination data communication device 13 in the new flexible arrangement.

More concretely, for example, the faster a communication speed is at which destination data communication device 13 transmits data blocks to its communication parties, the higher a score determining unit 111 gives to destination data communication device 13 will be; the larger a number of data blocks already stored in destination data communication device 13 is, the higher a score determining unit 111 gives to destination data communication device 13 will be; and the faster a communication speed is at which destination data communication device 13 receives data blocks from its communication parties, the higher a score determining unit 111 gives to destination data communication device 13 will be. Then, determining unit 111 multiplies each score given to destination data communication device 13 in accordance with each of rules (1)-(3) by a weight for each of rules (1)-(3), and sums the scores multiplied by the weights to determine an index of distribution performance of destination data communication device 13. The weights are predetermined so that each weight indicates a relative importance of each rule among rules (1)-(3). Determining unit 111 locates destination data communication devices 13 in descending order of the determined indices from upstream side to downstream side. FIG. 6(*a*) illustrates an example flexible arrangement of destination data communication devices 13 determined by determining unit 111 in the above-explained manner.

In the example flexible arrangement shown in FIG. 6(*a*), both of destination data communication device 13-5 and destination data communication device 13-2 are located at downstream ends of data communication paths. Determining unit 111 locates these destination data communication devices 13 at downstream ends as destination data communication devices 13 that only receive data blocks from other distribution data communication devices because, for example, these destination data communication devices 13 did not transmit any data block to any communication party in receiving side, i.e. communication speeds regarding communication parties in receiving side indicated by a communication status data set show "0 bps" or "null," or these destination data communication devices 13 transmitted data blocks to communication parties in receiving side at comparatively low speeds that might be caused by some sort of fault in communication.

After determining unit 111 determines positions of seven destination data communication devices 13 as shown in FIG. 6(*a*), determining unit 111 determines paths of data communications between two distribution data communication devices from among seven distribution data communication devices as shown by arrows in FIG. 6(*b*). Determining unit 111 determines positions and numbers of the paths (i.e. positions and numbers of the arrows in FIG. 6(*b*)) so that a sum of transmission speeds (a sum of communication speeds regarding communications with communication parties in receiving side) and a sum of reception speeds (a sum of communication speeds regarding communications with communication parties in transmitting side) of each destination data communication device 13 become as close as possible to each other. Accordingly, a number of communication parties (in transmitting side or in receiving side) assigned to each destination data communication device 13 and a relative position of destination data communication device 13 to the other distribution data communication devices may differ from those of other distribution data communication devices.

Next, determining unit 111 generates a communication party data set for each destination data communication device 13 in accordance with the paths of data communications determined in the above-explained manner FIG. 6(c) shows an example of communication party data set generated by determining unit 111 for destination data communication device 13-4 shown in FIG. 6(b). As already explained, communication party data sets generated by determining unit 111 are transmitted to each distribution data communication device by transmitting unit 112.

Until all of data blocks of data to be distributed are received by all of destination data communication devices 13, receiving unit 113 repeatedly receives communication status data sets and stored data volume data sets, determining unit 111 repeatedly generates communication party data sets, and transmitting unit 112 repeatedly transmits communication party data sets to each distribution data communication device.

After transmissions of data blocks of data to be distributed progress to a certain extent, some destination data communication devices 13 may complete receiving all data blocks of the data to be distributed. These destination data communication devices 13 that have completed receiving all data blocks start to function as distribution data communication devices that only transmit data blocks to other destination data communication devices 13 that have not completed receiving all data blocks yet.

Figure 7:
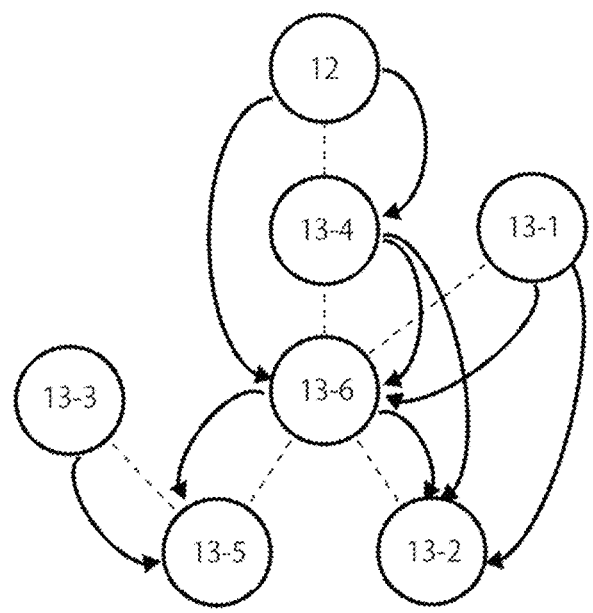
FIG. 7 illustrates a flexible arrangement of distribution data communication devices that is determined by a management data communication device according to an exemplary embodiment of the present invention.

FIG. 7 illustrates an example of flexible arrangement of destination data communication devices 13 that is determined by determining unit 111 in a case some of destination data communication devices 13 have completed receiving all data blocks, and paths of data transmissions determined by determining unit 111 in the flexible arrangement. In the example shown in FIG. 7, destination data communication devices 13-1 and 13-3 have completed receiving all data blocks, and these destination data communication devices 13 no longer need to receive any data block. Accordingly, destination data communication device 13-1 is dedicated to transmit data blocks to destination data communication devices 13-6 and 13-2, and destination data communication device 13-3 is dedicated to transmit data blocks to destination data communication device 13-5.

Now, an explanation of functional configuration of management data communication device 11 is completed, and functional configurations of source data communication device 12 and destination data communication devices 13 are explained below.

Figure 8:
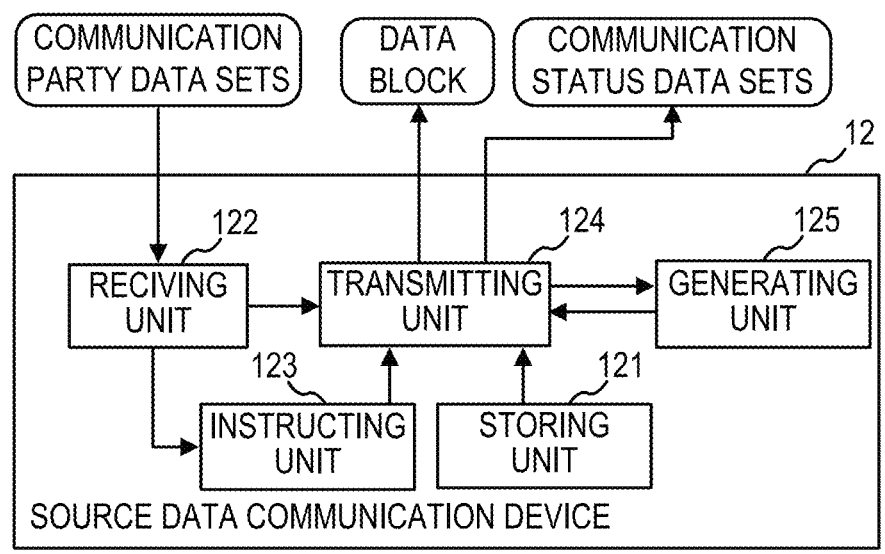
FIG. 8 is a block diagram illustrating a functional configuration of a source data communication device according to an exemplary embodiment of the present invention.

FIG. 8 is a block diagram illustrating a functional configuration of source data communication device 12. Namely, computer 10 used as hardware for source data communication device 12 functions as a device comprising components shown in FIG. 8 when it executes data processing following instructions in accordance with an application program according to this exemplary embodiment for source data communication device 12.

Source data communication device 12 comprises storing unit 121, receiving unit 122, instructing unit 123, transmitting unit 124, and generating unit 125. Storing unit 121 stores all data blocks of data to be distributed before distributions of the data are started. Receiving unit 122 receives communication party data sets from management data communication device 11. Instructing unit 123 instructs transmitting unit 124 to transmit data blocks to one or more destination data communication devices 13 indicated as candidate communication parties in receiving side by communication party data sets received by receiving unit 122. Transmitting unit 124 reads from storing unit 121 data blocks to be transmitted and transmits the data blocks to destination data communication devices 13 following instructions made by instructing unit 123. Generating unit 125 monitors communication speeds at which transmitting unit 124 transmits data blocks to each destination data communication device 13, and generates communication status data sets. Transmitting unit 124 transmits communication status data sets generated by generating unit 125 to management data communication device 11, in addition to transmissions of data blocks to destination data communication devices 13.

Figure 9:
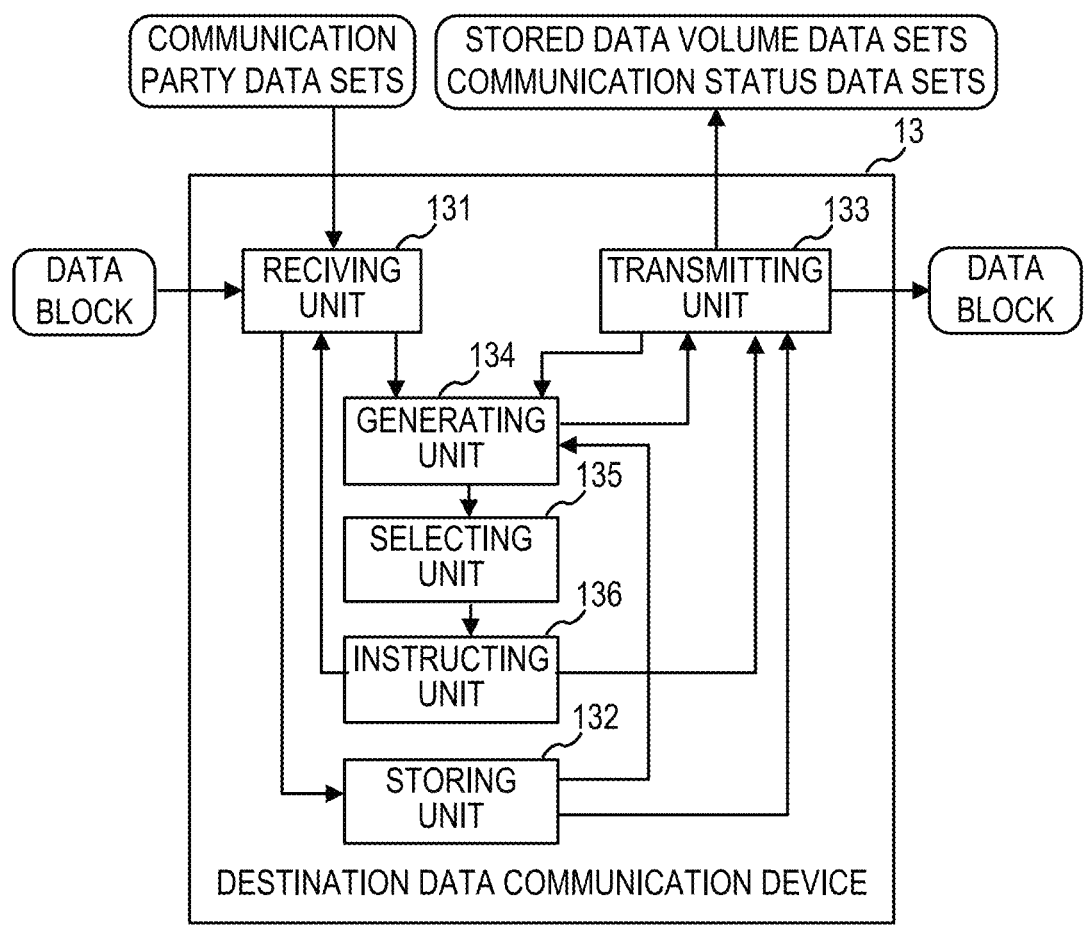
FIG. 9 is a block diagram illustrating a functional configuration of a destination data communication device according to an exemplary embodiment of the present invention.

FIG. 9 is a block diagram illustrating a functional configuration of destination data communication device 13. Namely, computer 10 used as hardware for destination data communication device 13 functions as a device comprising components shown in FIG. 9 when it executes data processing following instructions in accordance with an application program according to this exemplary embodiment for destination data communication device 13.

Destination data communication device 13 comprises receiving unit 131, storing unit 132, and transmitting unit 133. Receiving unit 131 receives communication party data sets from management data communication device 11, and receives data blocks of data to be distributed from other distribution data communication devices. Storing unit 132 stores data blocks received by receiving unit 131. Transmitting unit 133 transmits data blocks stored in storing unit 132 to other distribution data communication devices.

Destination data communication device 13 further comprises generating unit 134 and selecting unit 135. Generating unit 134 watches communication speeds at which receiving unit 131 receives data block to each destination data communication device 13 and communication speeds at which transmitting unit 133 transmits data blocks to each destination data communication device 13, and generates communication status data sets. Generating unit 134 also generates a stored data volume data set by dividing a number of data blocks that are stored in storing unit 132 by a total number of data blocks of the data to be distributed. Storing unit 132 may acquire the total number of data blocks from management data communication device 11 via destination data communication devices 13. Selecting unit 135 selects one or more communication parties with which destination data communication device 13 actually communicates from among candidate communication parties indicated by communication party data sets received by receiving unit 131 based on communication status data sets generated by generating unit 134. Selecting unit 135 may select, for example, one or more candidate communication parties whose communication speeds indicated by communication status data sets are equal to or more than a predetermined threshold value as communication parties with which destination data communication device 13 actually communicates.

Destination data communication device 13 further comprises instructing unit 136. Instructing unit 136 instructs receiving unit 131 to receive data blocks from distribution data communication devices selected by selecting unit 135 from among candidate communication parties in transmitting side indicated by a communication party data set. Instructing unit 136 also instructs transmitting unit 133 to transmit data blocks to destination data communication devices 13 selected by selecting unit 135 from among candidate communication parties in receiving side indicated by a communication party data set.

Transmission and receipt of data blocks between the distribution data communication devices are initialized, for example, when a distribution data communication device in receiving side, i.e. a distribution data communication device located in downstream side, requests a distribution data communication device in transmitting side, i.e. a distribution data communication device in upstream side, to transmit data blocks, and the distribution data communication device in transmitting side transmits data blocks to the distribution data communication device in receiving side if the distribution data communication device in transmitting side stores the requested data blocks.

Figure 10:
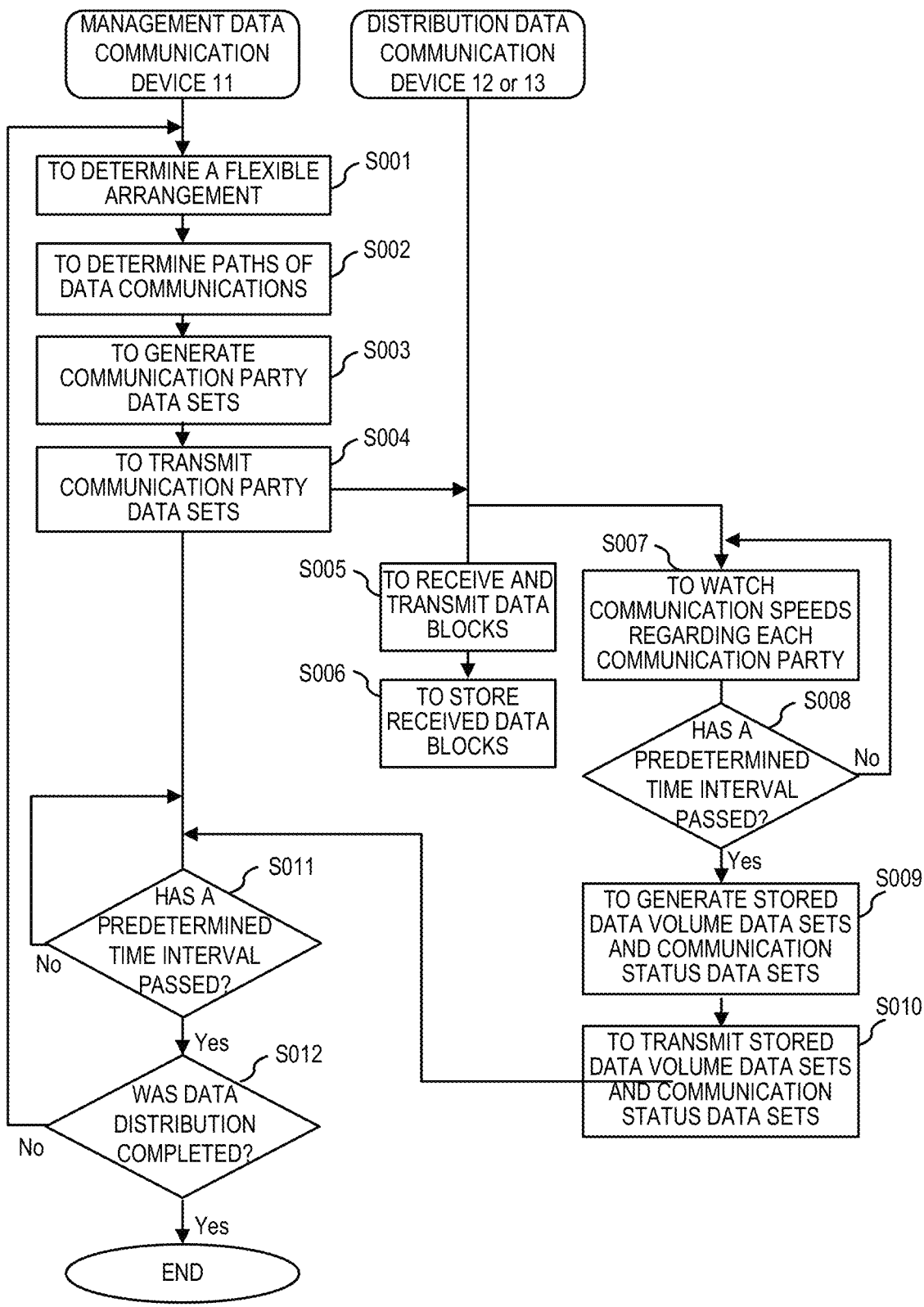
FIG. 10 is a flowchart illustrating a flow of processes executed by a data distribution system according to an exemplary embodiment of the present invention.

FIG. 10 is a flowchart illustrating a flow of processes executed by data distribution system 1 having the above-explained configuration for distributing data from source data communication device 12 to each destination data communication device 13. It is assumed that all data blocks of data to be distributed are stored in source data communication device 12 before the processes shown in FIG. 10 are performed.

First, management data communication device 11 determines a flexible arrangement of destination data communication devices 13 (step S001). Next, management data communication device 11 determines paths of data communications among the distribution data communication devices in the flexible arrangement (step S002). When management data communication device 11 performs step S001 at the first time, management data communication device 11 determines a flexible arrangement in a random manner. When management data communication device 11 performs step S002 at the first time, management data communication device 11 determines paths of data communications among the distribution data communication devices in accordance with a comparatively simple rule that each destination data communication device 13 receives data blocks from the first and the second nearest distribution data communication devices in upstream side.

Next, management data communication device 11 generates a communication party data set for each distribution data communication device indicating the determined paths of data communications (step S003). Next, management data communication device 11 transmits the generated communication party data set to each distribution data communication device (step S004).

When each distribution data communication device receives a communication party data set from management data communication device 11, it starts to receive data blocks from one or more communication parties indicated by the communication party data set, and it also starts to transmit data blocks to one or more communication parties indicated by the communication party data set (step S005). Each destination data communication device 13 stores the received data blocks (step S006). (Source data communication device 12 does not receive any data block and it is dedicated to transmit data blocks to destination data communication devices 13 in step S005.)

Each distribution data communication device watches communication speeds at which it communicates with each communication party (step S007) in parallel with processes in steps S005 and S006. Each distribution data communication device continuously repeats performing a check as to whether a predetermined time has passed (step S008). When a predetermined time has passed (step S008; Yes), each distribution data communication device generates a stored data volume data set and a communication status data set (step S009). Then, each distribution data communication device transmits them to management data communication device 11 (step S010).

Management data communication device 11 continuously repeats performing a check as to whether a predetermined time has passed (step S011) while management data communication device 11 receives stored data volume data sets and communication status data sets from the distribution data communication devices. When a predetermined time has passed (step S011; Yes), management data communication device 11 judges whether all of destination data communication devices 13 completed receiving all data blocks of the data to be distributed based on the received stored data volume data sets (step S012). When one or more stored data volume data sets indicate a percentage less than 100%, management data communication device 11 judges that the data distribution has not been completed yet (step S012; No). In the case, management data communication device 11 returns to step S001, and processes in step S001 and its subsequent steps are performed.

When management data communication device 11 performs step S001 the second time and after the second time, it determines flexible arrangements based on stored data volume data sets and communication status data sets received from the distribution data communication devices. Similarly, when management data communication device 11 performs step S002 the second time and after the second time, it determines paths of data communications among the distribution data communication devices based on stored data volume data sets and communication status data sets received from the distribution data communication devices. Then, management data communication device 11 repeats step S003 and following steps after step S002.

In step S012, when all stored data volume data sets indicate 100%, management data communication device 11 judges that the data distribution was completed (step S012; Yes). In this case, data distribution system 1 ends a series of processes for distributing data from source data communication device 12 to each destination data communication device 13.

According to data distribution system 1 explained above, a flexible arrangement of destination data communication devices 13 and paths of data communications among the distribution data communication devices are dynamically determined in accordance with a number of data blocks that are currently stored in each destination data communication device 13 and speeds of communications performed between each pair of distribution data communication devices. Accordingly, time required for distributing data from source data communication device 12 to each of plural destination data communication devices 13 may be reduced. Data distribution system 1 does not require a load distribution server device and data distribution server devices that perform data distributions under a control of the load distribution server device. Accordingly, data distribution system 1 may be implemented inexpensively.

In data distribution system 1, each destination data communication device 13 has a function to improve efficiency of the data distribution by autonomously selecting communication parties from among candidate communication parties determined by management data communication device 11 in accordance with a predetermined rule like the candidate communication parties whose communication speeds are equal to or higher than a predetermined threshold value should be selected as communication parties with which destination data communication device 13 actually performs data communications. Then, communication speeds resulting from the autonomous selection of communication parties performed by each destination data communication device 13 are reflected to the next determination of a flexible arrangement of destination data communication devices 13 and paths of data communications among the distribution data communication devices via communication status data sets. As a result, speedy data distribution is achieved.

[Modified Embodiments]

The above explained exemplary embodiment may be variously modified to be implemented within a scope of the technical thought of the present invention. Some of the modified embodiments are explained below.

[First Modified Embodiment]

In this modified embodiment, data distribution system 1 comprises one or more data communication devices that are not destinations of data to be distributed. Each of the data communication devices stores at least some of data blocks of the data to be distributed, and it is dedicated to transmit the data blocks to destination data communication devices 13. These data communication devices that store data blocks and are dedicated to transmit data blocks to destination data communication devices 13 are referred to as "distribution assistance data communication devices 14" hereinafter. Distribution assistance data communication devices 14 are also referred to as "distribution data communication devices" when they are not distinguished from source data communication device 12 and destination data communication devices 13.

Each distribution assistance data communication device 14 is not a current destination of data to be distributed, but it stores at least some of the data blocks of the data to be distributed since, for example, it was a destination of the data in the past. In other words, each distribution assistance data communication device 14 may have been destination data communication device 13 in the past. Accordingly, there is no difference between configurations of distribution assistance data communication device 14 and destination data communication device 13.

In this modified embodiment, determining unit 111 locates distribution assistance data communication devices 14 in a new flexible arrangement in accordance with, for example, the rules described below.

(1) The faster a communication speed is at which distribution assistance data communication device 14 transmits data blocks to its communication parties in receiving side, the closer a position to the upstream end should be determined to be as a position of distribution assistance data communication device 14 in a new flexible arrangement.

(2) The larger a number of data blocks is that are stored in distribution assistance data communication device 14, the closer a position to the upstream end should be determined to be as a position of distribution assistance data communication device 14 in the new flexible arrangement.

More concretely, for example, the faster a communication speed is at which distribution assistance data communication device 14 transmitted data blocks to its communication parties, the higher a score is that determining unit 111 gives to distribution assistance data communication device 14; and the larger a number of data blocks is that are stored in distribution assistance data communication device 14, the higher a score is that determining unit 111 gives to distribution assistance data communication device 14. Then, determining unit 111 multiplies each score given to distribution assistance data communication device 14 in accordance with each of rules (1) and (2) by a weight for each of rules (1) and (2), and sums the scores multiplied by the weights to determine an index of distribution performance of distribution assistance data communication device 14. Determining unit 111 sorts distribution assistance data communication devices 14 in descending order of the determined indices from upstream side to downstream side.

Determining unit 111 determines a flexible arrangement of destination data communication devices 13, adds distribution assistance data communication devices 14 to the flexible arrangement in the sorted order, and determines paths of data communications among distribution data communication devices in the flexible arrangement. Determining unit 111 determines positions and numbers of the paths so that a sum of transmission speeds and a sum of reception speeds of each distribution data communication device become as close as possible to each other.

Figure 11:
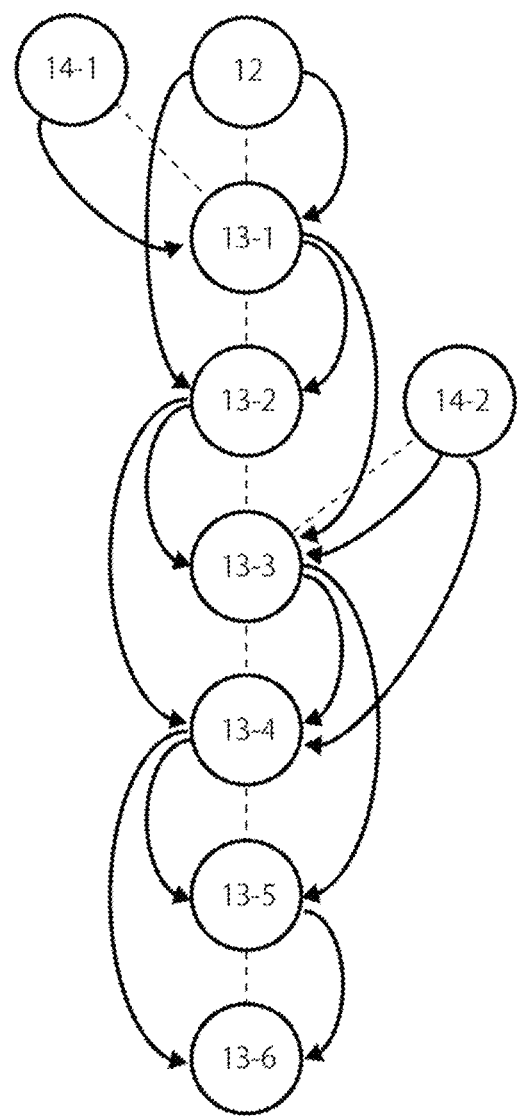
FIG. 11 illustrates a flexible arrangement of distribution data communication devices that is determined by a management data communication device according to a modified embodiment of the present invention.

FIG. 11 illustrates an example of flexible arrangement of the distribution data communication devices and examples of paths among the distribution data communication devices that are determined by determining unit 111 when distribution assistance data communication devices 14 are utilized in data distribution system 1. In the example shown in FIG. 11, distribution assistance data communication device 14-1 is assigned as a communication party in upstream side of destination data communication devices 13-1 and 13-2, and distribution assistance data communication device 14-2 is assigned as a communication party in upstream side of destination data communication devices 13-3 and 13-4.

According to this modified embodiment, capability of transmitting data blocks in data distribution system 1 may be increased by distribution assistance data communication devices 14 and speedy data distribution may be achieved.

[Second Modified Embodiment]

In this modified embodiment, data distribution system 1 comprises one or more communication devices that are not destinations of data to be distributed. The data communication devices have high capability of receiving and transmitting data, and they are installed to data distribution system 1 for the purpose of increasing a total speed of distributing data to destination data communication devices 13. These data communication devices that are installed to data distribution system 1 for the purpose of increasing a total distribution speed are referred to as "relay data communication devices 15" hereinafter. Relay data communication devices 15 are also referred to as "distribution data communication devices" when they are not distinguished from source data communication device 12 and destination data communication devices 13.

There is no difference between configurations of relay data communication device 15 and destination data communication device 13 except that relay data communication device 15 has high capability of receiving and transmitting data blocks compared to destination data communication device 13. In other words, when relaying data blocks, relay data communication device 15 has potential of achieving a higher transmitting speed and a higher receiving speed than destination data communication device 13.

For example, each relay data communication device 15 notifies management data communication device 11 that the device is functioning as relay data communication device 15. Determining unit 111 of management data communication device 11 recognizes relay data communication devices 15 by the notices received from relay data communication devices 15, and locates relay data communication devices 15 at positions in upstream side when determining unit 111 determines a flexible arrangement of the distribution data communication devices and paths of data communications among the distribution data communication devices.

According to this modified embodiment, capability of transmitting data blocks in data distribution system 1 may be increased by relay data communication devices 15 in upstream side and speedy data distribution may be achieved.

[Other Modifications]

(1) In the above-explained exemplary embodiment, data blocks are transmitted in an order following positions of the data blocks in the data to be distributed. The present invention is not limited in this respect, and data blocks may be transmitted from one distribution data communication device to another distribution data communication device in any order so long as each destination data communication device 13 can assemble the data blocks into the data to be distributed.

(2) In the above-explained exemplary embodiment, a stored data volume data set indicates a percentage of a number of data blocks that are stored in a distribution data communication device to a total number of data blocks. The present invention is not limited in this respect, and a stored data volume data set may indicate any type of index so long as it indicates a volume of stored data blocks compared to the total volume of data blocks of the data to be distributed. For example, a stored data volume data set may simply indicate a number of data blocks that are stored in destination data communication device 13. Alternatively, a stored data volume data set may indicate a ratio of volume of data blocks that are stored in destination data communication device 13 expressed by a number of bits to the total volume of the data to be distributed expressed by a number of bits.

(3) In the above-explained exemplary embodiment, source data communication device 12 and destination data communication devices 13 generate stored data volume data sets and communication status data sets, and transmit them to management data communication device 11, each time a predetermined interval has passed. The present invention is not limited in this respect, and any type of event may be used as a trigger of generating and transmitting stored data volume data sets and communication status data sets. For example, each destination data communication device 13 may generate a stored data volume data set and a communication status data set and transmit them to management data communication device 11 each time it receives a predetermined volume of data from other distribution data communication devices.

(4) In the above-explained exemplary embodiment, a communication status data set indicates communication speeds at which a distribution data communication device communicated with its communication parties after the last communication status data set was generated. The present invention is not limited in this respect. For example, a communication status data set may indicate communication speeds at which a distribution data communication device communicated with its communication parties during the most recent period of a predetermined length including a period before the timing when the last communication status data set was generated. Alternatively, a communication status data set may indicate a weighted average of communication speeds assigning a larger weight to communication speeds measured in a recent period and assigning a smaller weight to communication speeds measured in a previous period.

(5) In the above-explained exemplary embodiment, a communication status data set generated by a distribution data communication device in upstream side indicates a communication speed at which the distribution data communication device in upstream side transmitted data blocks to a distribution data communication device in downstream side, and a communication status data set generated by the distribution data communication device in downstream side indicates a communication speed at which the distribution data communication device in downstream side received data blocks from the distribution data communication device in upstream side. These communication speeds indicated by the communication status data sets generated by these distribution data communication devices are identical to each other. Accordingly, a communication status data set may indicate either communication speeds at which a distribution data communication device transmitted data blocks to its communication parties, or communication speeds at which a distribution data communication device received data blocks from its communication parties.

(6) In the above-explained exemplary embodiment, determining unit 111 determines a flexible arrangement whose shape is essentially a single line. The present invention is not limited in this respect, and any type of shape may be used as a shape of flexible arrangement determined by determining unit 111. For example, determining unit 111 may determine a flexible arrangement where distribution data communication devices are arranged in plural lines, in a tree shape, in a mesh form, etc.

(7) In the above-explained exemplary embodiment, when determining unit 111 determines a flexible arrangement the first time, it determines an order of destination data communication devices 13 in a random manner. The present invention is not limited in this respect, and determining unit 111 may determine a flexible arrangement the first time in accordance with a predetermined rule. For example, determining unit 111 may estimate distances between each pair of distribution data communication devices from among the distribution data communication devices in a network based on their IP addresses in the network, and determine a flexible arrangement so that the closer a pair of distribution data communication devices are in the network, the closer the pair of distribution data communication devices are in the flexible arrangement.

(8) When determining unit 111 determines a flexible arrangement of destination data communication devices 13 the first time, it may determine the flexible arrangement based on communication status data sets that management data communication device 11 received from the distribution data communication devices in a data distribution performed in the past instead of determining the flexible arrangement in a random manner.

(9) In the above-explained exemplary embodiment, management data communication device 11 and source data communication device 12 are configured as different devices. Alternatively, management data communication device 11 and source data communication device 12 may be integrated into a single device.

(10) In the above-explained exemplary embodiment, data distribution system 1 comprises only one of source data communication device 12. Alternatively, data distribution system 1 may comprise plural source data communication devices 12. In the case, each source data communication device 12 may transmit data blocks in parallel, and speedy data distribution may be achieved.

(11) In the above-explained exemplary embodiment, each of management data communication device 11, source data communication device 12, and destination data communication devices 13 is realized by a computer for general purpose when the computer executes data processing following instructions of an application program according to the present invention. Alternatively, at least one of these devices may be configured as a dedicated purpose device.

(12) The rules for determining a flexible arrangement described in the explanation of the exemplary embodiment are merely examples for the explanation, and any other rules may be used for determining unit 111 to determine a flexible arrangement.

(13) In the above-explained exemplary embodiment, management data communication device 11 assigns communication parties in upstream side and communication parties in downstream side to each distribution data communication device. Alternatively, management data communication device 11 may assign communication parties to each distribution data communication device without distinguishing the communication parties into communication parties in upstream side and communication parties in downstream side. In this case, each distribution data communication device may transmit data blocks to any of the communication parties and receive data blocks from any of the communication parties. In this case, each distribution data communication device may generate a communication status data set that indicates a transmission speed and a reception speed in connection with each communication party. In this modified embodiment, destination data communication device 13 may be allowed to transmit data blocks to its communication parties in upstream side when destination data communication device 13 has received and stored more data blocks than its communication parties in upstream side. As a result, a speedy data distribution may be achieved.

(14) In the above-explained exemplary embodiment, a communication party data set usually indicates IP addresses of distribution data communication devices in upstream side and IP addresses of distribution data communication devices in downstream side. A communication party data set may indicate any type of identifiers of communication parties instead of IP addresses as far as distribution data communication devices can identify nodes of their communication parties in the network by the identifiers. Further, a communication party data set may indicate information used for establishing and maintaining communications between distribution data communication devices such as information of usable communication protocols, port numbers used in these communication protocols, etc., in addition to identifiers of nodes of communication parties. In this case, there is no need to notify each distribution data communication devices of the information used for establishing and maintaining communications by a different process.

(15) In the above-explained exemplary embodiment, transmissions and receptions of data blocks between the distribution data communication devices are initialized when a distribution data communication device in receiving side requests a distribution data communication device in transmitting side to transmit data blocks, and the distribution data communication device in transmitting side transmits data blocks to the distribution data communication device in receiving side if the distribution data communication device in transmitting side stores the requested data blocks. The present invention is not limited in this respect, and any other procedure for checking whether a distribution data communication device in upstream side stores data blocks that a distribution data communication device in downstream side needs to receive may be used. For example, a distribution data communication device may inform a communication party in downstream side of data blocks that the distribution data communication device stores and ready to be transmitted; the communication party in downstream side may request the distribution data communication device for all or some of the informed data blocks that the communication party has not received yet; and the distribution data communication device may transmit the requested data blocks to the communication party in downstream side.

(16) Any one of the application programs for management data communication device 11, source data communication device 12 and destination data communication device 13 in the above-explained exemplary embodiment may be stored in a recording medium and the recording medium storing the application program may be distributed to a user of computer 10. In the case, the application program may be read by computer 10 from the recording medium. Alternatively, any one of these application programs may be downloaded to computer 10 via a network.

INDUSTRIAL APPLICABILITY

The present invention is applicable in service industries for distributing data.

DESCRIPTION OF REFERENCE NUMERALS

1: data distribution system, 10: computer, 11: management data communication device, 12: source data communication device, 13: destination data communication device, 14: distribution assistance data communication device, 15: relay data communication device, 101: CPU, 102: memory, 103: communication I/F, 111: determining unit, 112: transmitting unit, 113: receiving unit 113, 121: storing unit, 122: receiving unit, 123: instructing unit, 124: transmitting unit, 125: generating unit, 131: receiving unit, 132: storing unit, 133: transmitting unit, 134: generating unit, 135: selecting unit, 136: instructing unit.

What is claimed is:
1. A data distribution system comprising:
plural distribution data communication devices, each of the plural distribution data communication devices comprising a first processor operatively coupled to a first memory and a first communication interface, and performing at least one of transmission of data to be distributed and reception of the data to be distributed, and
a management data communication device that comprises a second processor operatively coupled to a second memory and a second communication interface and manages paths of data communications among the plural distribution data communication devices;
wherein:
the second processor is capable of,
receiving, each time a predetermined condition is met, from each of the plural distribution data communication devices, a communication status data set indicating a communication speed at which the plural distribution data communication device communicates with each of its counter parties, and a stored data volume data set indicating a volume of data that has been already received out of the data to be distributed and is stored in the first memory of the distribution data communication device, determining, each time a predetermined condition is met, for each of the plural distribution data communication devices, one or more communication parties from among the plural distribution data communication devices based on the communication status data set and the stored data volume data set received from each of the plural distribution data communication devices, in accordance with a predetermined rule, and transmitting to each of the plural distribution data communication devices a communication party data set indicating the determined one or more communication parties of the distribution data communication device; and wherein:

the first processor of each of the plural distribution data communication devices is capable of, receiving from the management data communication device a communication party data set indicating one or more communication parties of the distribution data communication device, performing at least one of a reception of at least a part of the data to be distributed from the one or more communication parties indicated by the communication party data set and a transmission of at least a part of the data to be distributed to the one or more communication parties indicated by the communication party data set, when the reception of at least a part of the data to be distributed was performed, storing in the first memory the at least a part of the data to be distributed, generating a stored data volume data set indicating a volume of data that has been already received out of the data to be distributed and stored in the first memory, and a communication status data set indicating at least one of a communication speed at which the transmission of at least a part of the data to be distributed to each communication party was performed and a communication speed at which the reception of at least a part of the data to be distributed from each communication party was performed; and transmitting to the management data communication device, each time a predetermined condition is met, the communication status data set and the stored data volume data set.

2. The data distribution system according to claim 1, wherein:

the first processor is further capable of, selecting, when the communication party data set indicates plural communication parties, one or more communication parties from among the plural communication parties indicated by the communication party data set based on the communication status data set in accordance with a predetermined rule, and performing at least one of a reception of at least a part of the data to be distributed from the selected one or more communication parties a transmission of at least a part of the data to be distributed to the selected one or more communication parties.

* * * * *